F. E. EDWARDS.
CIRCUIT CLOSER.
APPLICATION FILED AUG. 6, 1917.
1,309,881. Patented July 15, 1919.
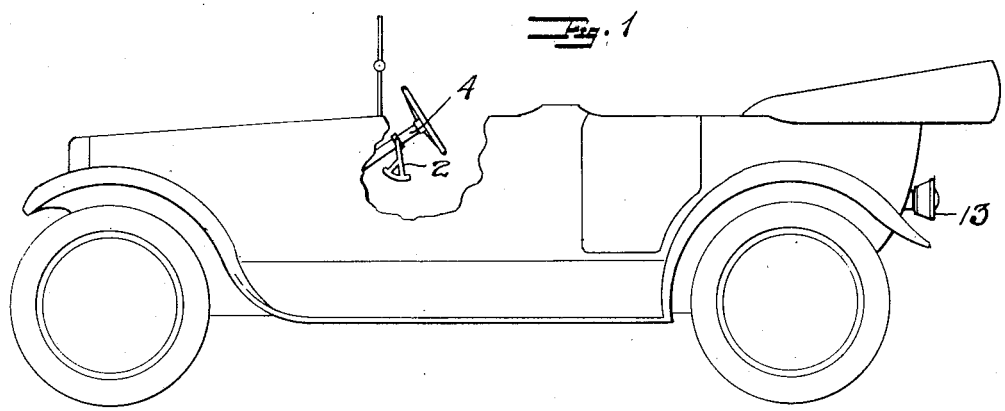
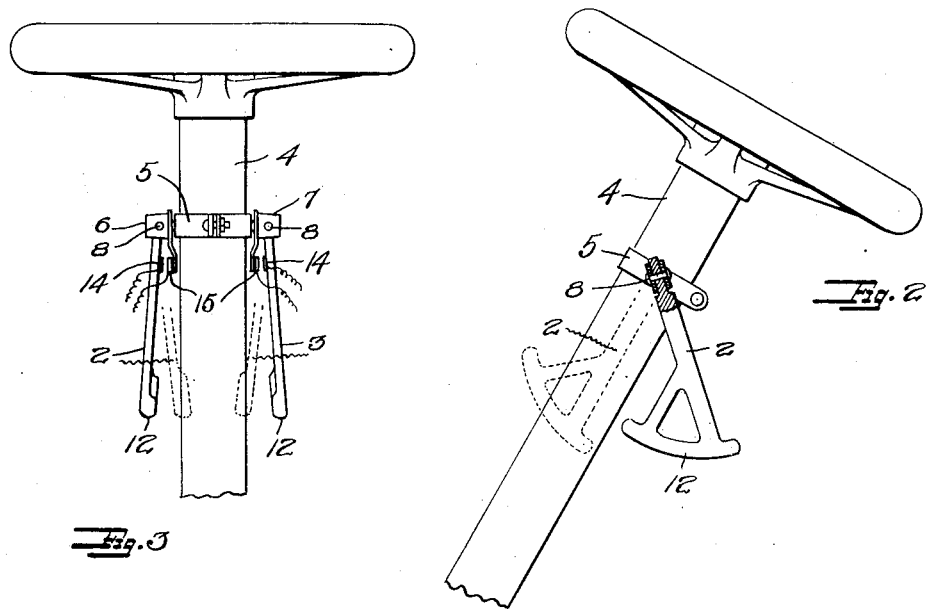
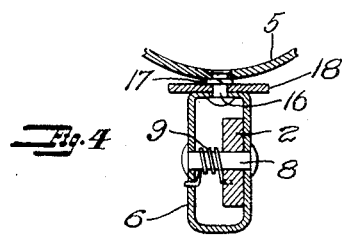
Witness
J. B. Gardner.
INVENTOR
F. E. EDWARDS
By White & Pint
ATTORNEYS

UNITED STATES PATENT OFFICE.

FREDERICK E. EDWARDS, OF SAN FRANCISCO, CALIFORNIA.

CIRCUIT-CLOSER.

1,309,881.      Specification of Letters Patent.      Patented July 15, 1919.

Application filed August 6, 1917. Serial No. 184,612.

*To all whom it may concern:*

Be it known that I, FREDERICK E. EDWARDS, a citizen of the United States, and a resident of the city and county of San Francisco and State of California, have invented a certain new and useful Circuit-Closer, of which the following is a specification.

The invention relates to a signal device arranged on the rear of an automobile to indicate the driver's intentions in regard to the subsequent movement of the automobile and particularly to means for operating the signal device.

An object of the invention is to provide means for operating the signal device other than by the hands or feet of the driver.

A further object of the invention is to provide signal-operating means which are controlled by the knees of the driver.

A further object of the invention is to provide signal-operating means of the class described which may be moved so that they will not interfere with the movement of the driver into or out of his seat.

The invention possesses other advantageous features, some of which, with the foregoing, will be set forth at length in the following description where I shall outline in full, that form of the invention which I have selected for illustration in the drawings accompanying and forming part of the present specification. In said drawings I have shown one specific form of my generic invention, but it is to be understood that I do not limit myself to such form, since the invention as expressed in the claims, may be embodied in a plurality of forms.

My invention relates particularly to the devices for controlling the operation of the signal and not to the signal itself, nor to the means whereby the motion of the controlling device is caused to operate the signal. The signal may be mechanical or electrical and the connections between the controlling device and the signal may be mechanical or electrical. In the accompanying drawings which illustrate one embodiment of my invention, I have shown an electric signal and electrical connections between the control device and the signal. In said drawings, Figure 1 is a side view of an automobile showing the device of my invention in its environments.

Fig. 2 is a side view of the device of my invention arranged on the steering column.

Fig. 3 is a front view of the device on the steering column.

Fig. 4 is a sectional view showing the constructional details of the device.

The control device of my invention comprises a pair of arms 2—3 mounted on the steering column 4 or other stationary part of the automobile, so that they may be readily engaged and moved by the knees of the driver. In the present construction, the arms are mediately attached to a clamp 5 on the steering column. Secured to the steering column are brackets 6—7 to which the arms 2—3 are connected by the pivots 8, so that the arms are movable in substantially vertical arcs. A spring 9, connecting the arm and the bracket, tends to hold the arm in its outward position. The lower ends 12 of the arms are widened, so that the arm may be readily engaged by the knee of the driver. The arms are connected with the signal device 13 on the rear of the vehicle in such manner that a movement inward of one arm, preferably the right arm 3, will operate the signal to indicate a turn to the right and a movement inward of the left arm will indicate a turn to the left. The springs 9 normally hold the arms in their outward positions and return them to such positions when the inward pressure on them is released.

In the present construction the rear end signal 13 is electrically operated and the control device is arranged so that inward movements of the arms close electric circuits, thereby causing an operation of the signal. Secured to the brackets 6—7 adjacent each arm, is a contact 15 in the signal circuit and secured to the arm is a contact 14 in the circuit, which is adapted to be brought into engagement with contact 15 when the arm is pressed inward.

The arms are so mounted on the clamp, that they may be swung forward or backward to accommodate drivers of different sizes and so that they may be moved to a position in front of or parallel with the steering column, so that they will not be in the way of the driver as he is getting into or out of his seat. This is preferably accomplished by pivotally attaching the brackets 6—7 to the clamp 5 by the bolts or rivets 16. To prevent this connection from becoming loose and thereby failing to hold the arms in the desired position, a spring washer 17 is arranged on the bolt or rivet between the clamp 5 and the base 18 of the bracket.

I claim:

1. An apparatus for controlling a signal device on an automobile, comprising a movable arm arranged to be engaged by the knee of the driver, circuit closing means operated by the movement of said arm, and a pivotal mounting for said arm whereby the arm may be swung into and out of the path of movement of the knee of the driver.

2. An apparatus for controlling a signal device on an automobile, comprising a pivotally mounted bracket, a movable arm arranged on said bracket, and contact points on said bracket and said arm adapted to be engaged by movement of said arm.

3. In combination with the steering column of an automobile, a circuit closer comprising a clamp ring arranged on said column, a bracket pivoted on said ring and adapted to swing in a plane parallel to the axis of said column, an arm mounted on said bracket to swing in a plane perpendicular to said first mentioned plane, and contact points on said bracket and said arm adapted to be engaged by movement of said arm.

In testimony whereof, I have hereunto set my hand at Berkeley, California, this 28th day of July 1917.

FREDERICK E. EDWARDS.

In presence of—
H. G. PROST.